(12) United States Patent
Johnson et al.

(10) Patent No.: US 10,998,648 B1
(45) Date of Patent: May 4, 2021

(54) ELECTRICAL GROUND STRAP ASSEMBLY PROVIDING INCREASED POINT OF CONTACT BETWEEN A TERMINAL AND A BOLT

(71) Applicant: Production Spring, LLC, Troy, MI (US)

(72) Inventors: Lawrence Johnson, Taylor, MI (US); Arturo Spaccarotelli, Saint Clair Shores, MI (US); Allan Anthony, Kimball, MI (US)

(73) Assignee: PRODUCTION SPRING, LLC, Troy, MI (US)

( * ) Notice: Subject to any disclaimer, the term of this patent is extended or adjusted under 35 U.S.C. 154(b) by 0 days.

(21) Appl. No.: 16/656,010

(22) Filed: Oct. 17, 2019

(51) Int. Cl.
| H01R 4/30 | (2006.01) |
| H01R 11/12 | (2006.01) |
| H01R 43/00 | (2006.01) |
| B60R 16/02 | (2006.01) |
| H01R 4/26 | (2006.01) |
| B62D 65/02 | (2006.01) |
| H01R 4/34 | (2006.01) |

(52) U.S. Cl.
CPC ......... *H01R 4/304* (2013.01); *B60R 16/0215* (2013.01); *H01R 4/26* (2013.01); *H01R 11/12* (2013.01); *H01R 43/00* (2013.01); *B62D 65/02* (2013.01); *H01R 4/34* (2013.01)

(58) Field of Classification Search
CPC . H01R 4/304; H01R 4/26; H01R 4/34; H01R 11/12; H01R 43/00; B60R 16/0215
USPC .......................................... 439/388; 429/182
See application file for complete search history.

(56) References Cited

U.S. PATENT DOCUMENTS

| 3,535,678 | A | * | 10/1970 | Gulistan Bulent | ...... H01R 4/64 439/877 |
| 5,388,941 | A | * | 2/1995 | Wuenscher | ............ B62D 5/061 411/303 |
| 5,442,133 | A | | 8/1995 | Arnold et al. | |
| 6,318,940 | B1 | * | 11/2001 | Mitts | ..................... B23P 19/062 411/181 |
| 6,746,285 | B2 | * | 6/2004 | Delcourt | .................. H01R 4/30 439/766 |
| 6,864,015 | B2 | * | 3/2005 | Peterson | ............... H01M 2/305 429/182 |
| 7,056,161 | B2 | * | 6/2006 | Delcourt | .................. H01R 4/30 174/51 |
| 7,892,049 | B1 | | 2/2011 | Andler et al. | |
| 8,070,404 | B1 | * | 12/2011 | Schluter | ................ F16B 41/002 411/368 |

(Continued)

FOREIGN PATENT DOCUMENTS

| CN | 206338301 | * | 7/2017 | ............. F16B 35/04 |
| DE | 29908831 | * | 7/1999 | ............. B23K 35/02 |

*Primary Examiner* — Peter G Leigh
(74) *Attorney, Agent, or Firm* — Dinsmore & Shohl LLP (57) ABSTRACT

An electrical ground strap assembly for an automotive vehicle. The assembly includes a carrier plate, a bolt having an incline portion, and a nut having an interior chamfer, the interior chamfer being oriented at an angle corresponding to the incline portion of the bolt. In use, the electrode is lowered onto the bolt and the nut is then lowered onto the bolt and the electrode. As the nut comes into contact with the electrode, the electrode is deformed therebetween to provide a mating fit between the incline portion of the bolt and the interior chamfer of the nut.

20 Claims, 10 Drawing Sheets

(56) References Cited

U.S. PATENT DOCUMENTS

| | | | | |
|---|---|---|---|---|
| 8,141,229 B2* | 3/2012 | Babej | ............... | F16B 37/065 |
| | | | | 29/525.06 |
| 8,360,811 B2* | 1/2013 | Aoki | ............... | H01R 4/34 |
| | | | | 439/801 |
| 8,845,254 B2* | 9/2014 | Lee | ............... | F16B 39/282 |
| | | | | 411/331 |
| 9,175,715 B2* | 11/2015 | Babej | ............... | F16B 19/00 |
| 9,520,657 B2* | 12/2016 | Lawson | ............... | H01R 4/34 |
| 9,680,239 B2* | 6/2017 | Boyer | ............... | H01R 4/64 |
| 2004/0259431 A1* | 12/2004 | Delcourt | ............... | H01R 4/30 |
| | | | | 439/766 |
| 2010/0074712 A1* | 3/2010 | Shinjo | ............... | F16B 37/068 |
| | | | | 411/337 |
| 2018/0266475 A1* | 9/2018 | Hoshino | ............... | F16B 37/068 |

* cited by examiner

FIG. 10

ELECTRICAL GROUND STRAP ASSEMBLY PROVIDING INCREASED POINT OF CONTACT BETWEEN A TERMINAL AND A BOLT

TECHNICAL FIELD

The present disclosure pertains to a system for providing an electrical ground connection. More particularly, the present disclosure concerns a system for facilitating an electrical ground connection in an automotive vehicle. Even more particularly, the present disclosure relates to electrical ground connections utilizing a stud/nut combination assembly.

BACKGROUND

An electrical ground strap or ground wire in an automotive vehicle is a cable that connects the engine block to the chassis, or possible directly to the negative terminal of the battery. The ground strap completes the electrical circuit for numerous accessories, such as the ignition system, the alternator, or any number of sensors in the vehicle.

Electrical ground straps are ribbons of braided steel without any insulation. An electrode at the end of the ground strap is positioned around a bolt secured to the vehicle accessory or grounding component and locked in place by a nut. One common reason ground straps fail is because the individual strands of steel may snap over time due to the vibration and movement of the engine and other components of the vehicle. Alternatively, vehicle vibration may cause the contact between the electrode and the vehicle accessory or grounding component to become weaker or separate. Once a ground strap fails, whatever component is attached to that ground strap will become weaker. Some signs of defective ground straps include a dead battery, hard starting, cylinder misfire, loss of power, and the check engine light being active.

The prior art has addressed this situation by proposing a number of electrical grounding straps. For example, U.S. Pat. Nos. 5,442,133, 6,746,285, 7,056,161, and 7,892,049. However, these prior art references fail to teach any improvement in the connection between the electrode and the accessory or grounding component.

Thus, there exists a need in the art to provide an electrical ground strap that provides an improved connection between the strap and the component or accessory to which it is attached in order to reduce the likelihood of the strap failing. As in so many areas of automotive technology, there is always room for improvement related to electrical connection assemblies.

SUMMARY

The present disclosure overcomes the problems associated with known electrical ground strap assembly by providing an increased point of contact between a terminal and the point of contact, such as a carrier plate.

Particularly, the present disclosure provides an electrical ground strap assembly including a carrier plate, a bolt having a head, a body including a vertical portion and an incline portion, and a shaft, the incline portion being oriented at an angle ranging from 30 to 60 degrees with respect to the base, and a nut having an interior chamfer, the interior chamfer being oriented at an angle corresponding to the incline portion of the bolt.

It is to be understood that when a terminal is attached to be fitted around the bolt and a nut lowered or engaged thereonto, the terminal is deformed around the incline portion of the base in order to provide a mating fit. This provides improved contact between the two components and reducing risk of failure during use.

The above advantages, in addition to other advantages and features, will be readily apparent from the following detailed description of the present disclosure when taken in connection with the accompanying drawings.

BRIEF DESCRIPTION OF THE DRAWINGS

For a more complete understanding of the present disclosure, reference should now be made to the embodiments illustrated in greater detail in the accompanying drawings and described below by way of examples of the present disclosure wherein.

DETAILED DESCRIPTION

In the following figures, the same reference numerals will be used to refer to the same components. In the following description, various operating parameters and components are described for different constructed embodiments. These specific parameters and components are included as examples and are not meant to be limiting.

Figure 1:
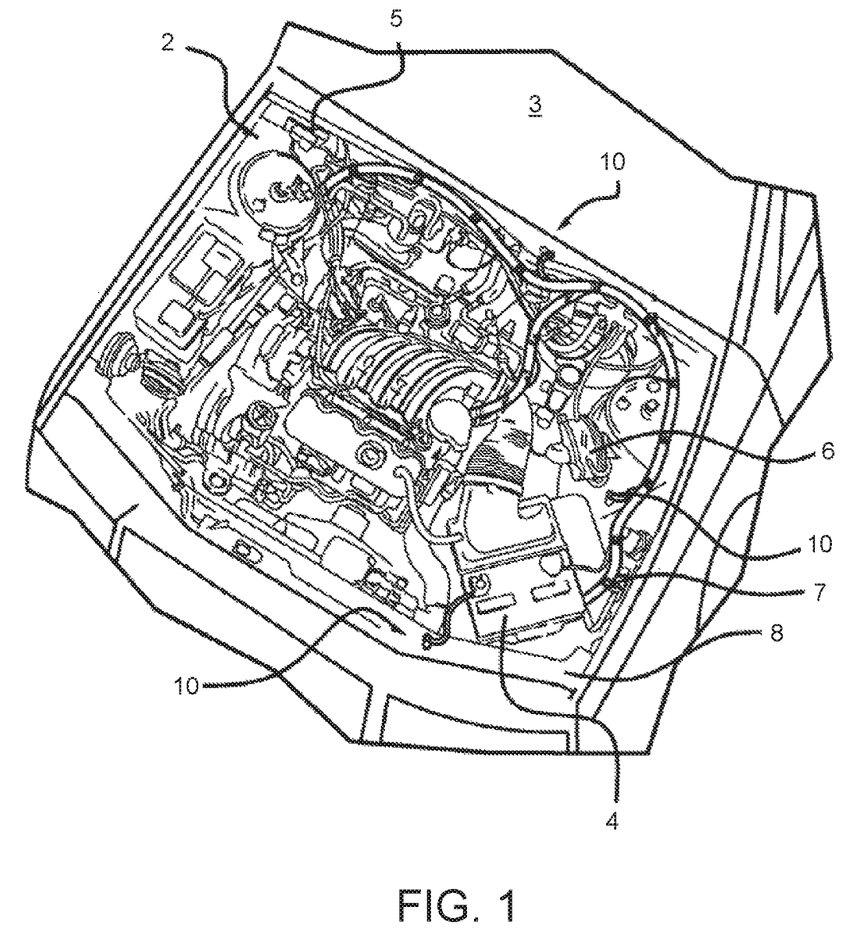
FIG. 1 is a perspective view of an engine compartment of an automotive vehicle employing an embodiment of the present disclosure.

FIG. 1 shows an electrical ground strap assembly 10 of the present disclosure employed in an engine compartment 2 of an automotive vehicle 3. The electrical ground strap assembly 10 is operable to conduct electricity from an electrical component, such as a battery 4, direct current window wiper motor 5, horn 6, power distribution box 7 or the like, to a conductive metal panel or frame 8 of the vehicle.

Figure 2:
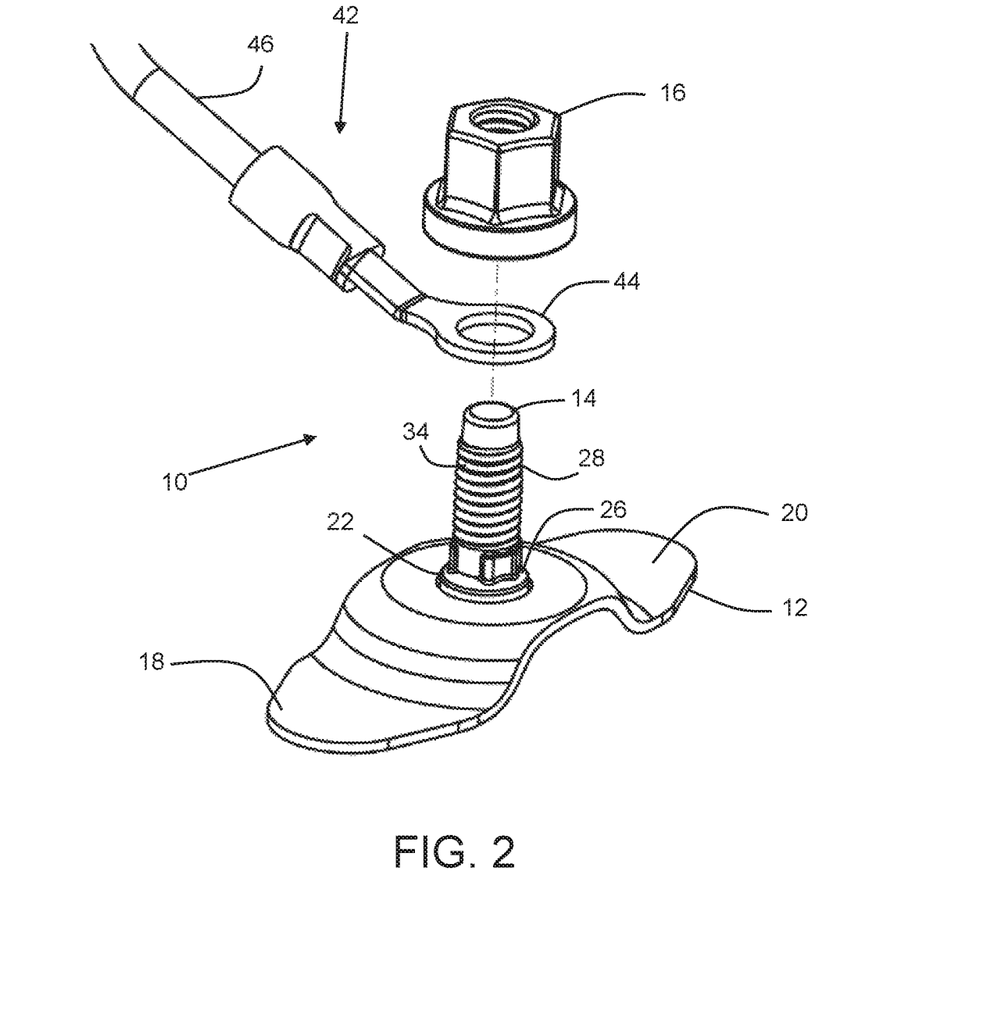
FIG. 2 is a perspective exploded view of an electrical ground strap assembly in accordance with an embodiment of the present disclosure.

In accordance with the present disclosure and with reference to the drawings, there is provided an electrical ground strap assembly denoted at 10 including a carrier plate 12, a bolt 14, and a nut 16. The carrier plate 12 may have any suitable geometry such as elongated or circular. As shown in FIG. 2, the carrier plate 12 has an elongated geometry. Regardless of its geometry, the carrier plate 12 includes at least two contact surfaces 18, 20 at which the carrier plate 12 is welded to a metal structure such as those found in an automobile requiring increased electrical grounding. The contact surfaces 18, 20 are coplanar with a top surface of the carrier plate 12. The carrier plate 12 also includes an opening 22 formed in a center thereof to allow the bolt 14 to extend through. Once the bolt 14 extends through the carrier plate 12, the two components are welded together.

Figure 3:
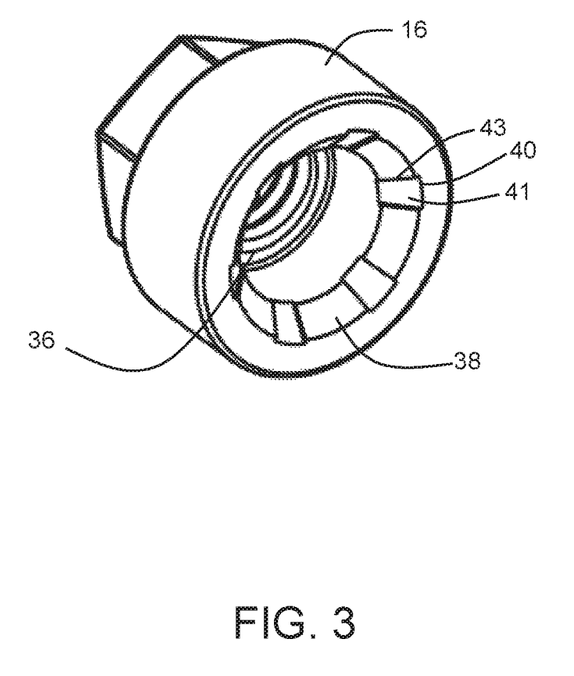
FIG. 3 is a bottom perspective view of a nut in accordance with the present disclosure illustrated in FIG. 2.
Figure 5:
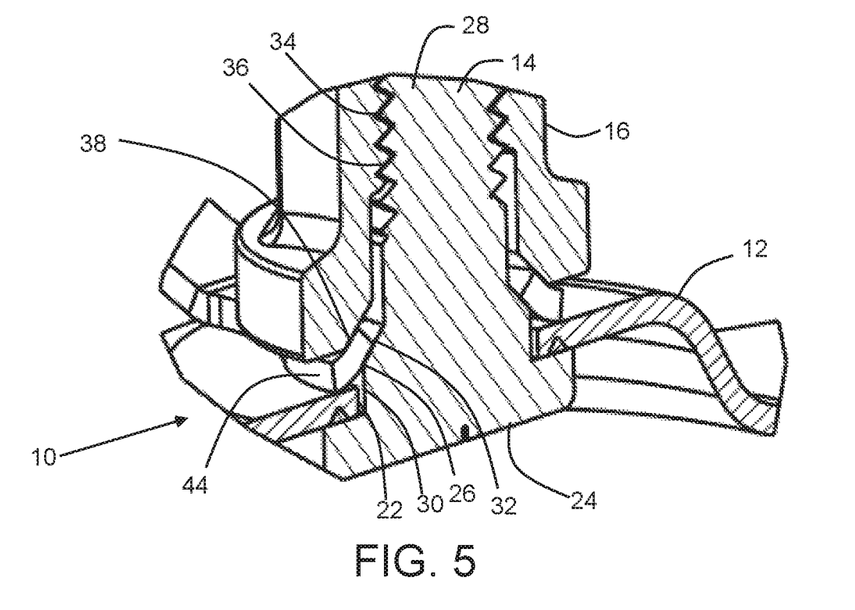
FIG. 5 is a partial perspective view of the electrical ground strap assembly shown in cross-section taken along the line 5-5 of FIG. 4 in a tightened state.

As shown in FIG. 5, the bolt 14 includes a head 24, a body 26, and a shaft 28. The body 26 includes a vertical portion 30 extending perpendicular to the head 24 and an incline portion 32 extending inwardly, thereby interconnecting the body 26 and the shaft 28. In some embodiments, the incline portion 32 has a slope of between 30-60 degrees. More particularly, the incline portion 32 has a slope of 45 degrees±5 degrees or ±10 degrees. The diameter of the head 24 of the bolt 14 is larger than the diameter of the opening 22 in the carrier plate 12 in order to prevent the bolt 14 from extending entirely through the carrier plate 12. The shaft 28 has a plurality of external threads 34 in order to engage the nut 16 as it is screwed onto the shaft 28. As shown in FIG. 3, the nut 16 includes a plurality of internal threads 36 and a chamfer 38. Thus, the external threads 34 of the shaft 28 engage the internal threads 36 of the nut 16. At least one scraping feature 40 is formed on the chamfer for purposes discussed in more detail below. Each scraping feature 40 includes a raised ledge 41 having a thickness defined by a scraping edge 43, which extends between the chamfer 38 and the raised ledge 41.

Figure 4:
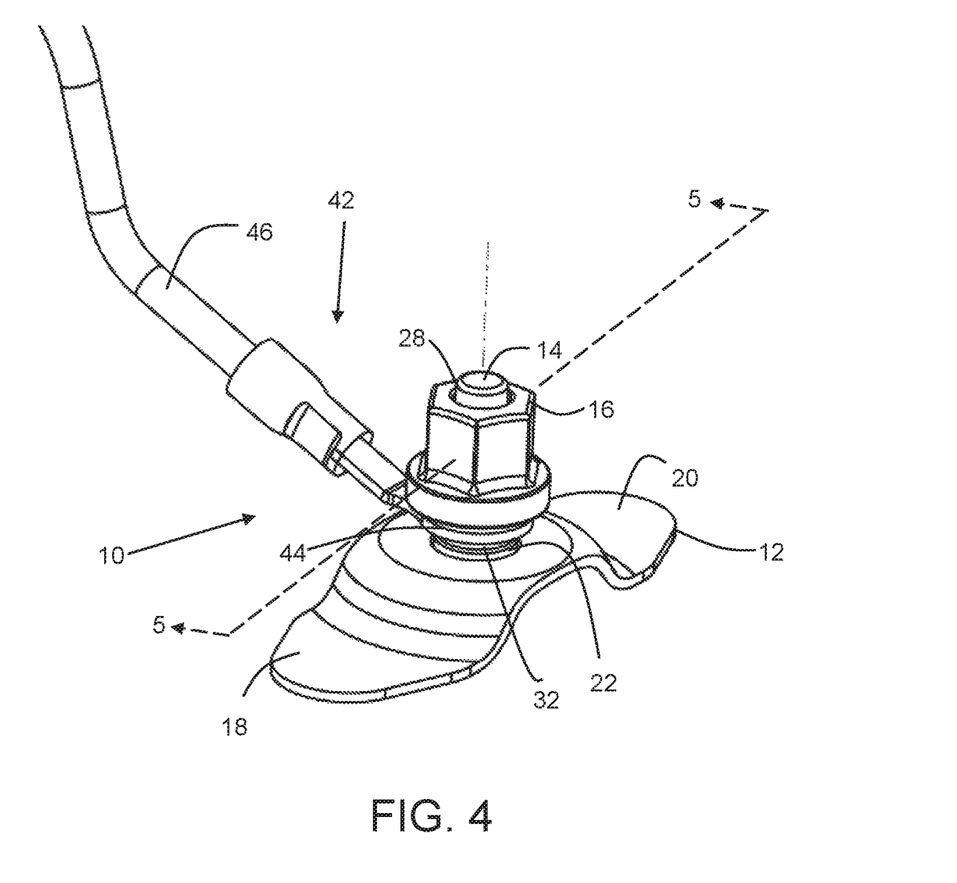
FIG. 4 is a perspective view of the electrical ground strap assembly in a pre-tightened state.

As shown in FIG. 2, a terminal 42 is shown including an electrical contact electrode 44 and a strap 46. Prior to the nut 16 being lowered onto the bolt 14, the electrode 44 is situated around the shaft 28 and lowered onto the incline portion 32. As shown in FIG. 4, the electrode 44 is lowered onto the bolt 14 and the nut 16 is lowered onto the electrode 44. However, due to the diameter of the vertical portion 30 of the bolt 14 being greater than the diameter of the electrode 44, the electrode 44 does not sit flush on the top of the carrier plate 12. Thus, this illustrates the electrical ground strap assembly 10 in a pre-tightened state before the electrode 44 is deformed. It should be understood that all reference to any component being "lowered" onto another component should not be interpreted as being limiting to that occurring in a downward direction. It is understood that the present disclosure may be suitable in any arrangement and, thus, all reference to the nut 16 or terminal 42 being lowered onto the bolt 14 should be understood as the two components being "engaged."

Figure 6:
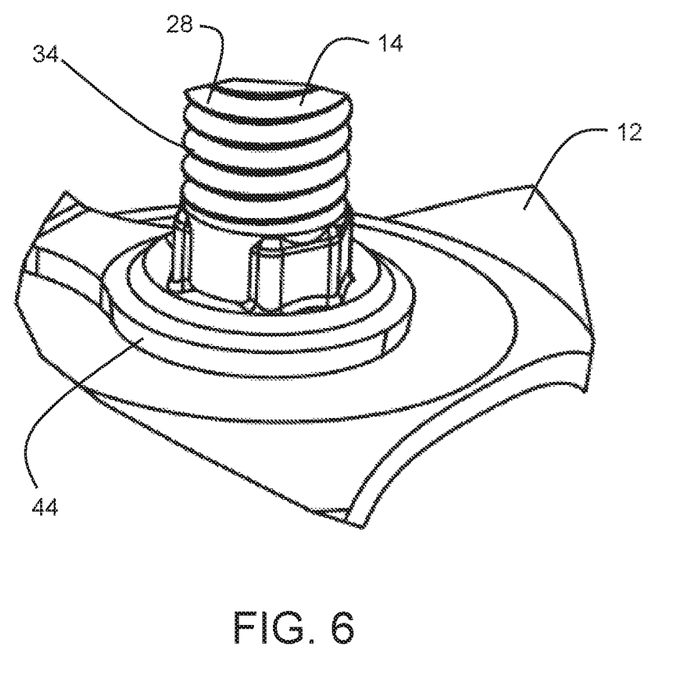
FIG. 6 is a partial perspective view of the electrical ground strap assembly in the tightened state with the nut removed.

As shown in FIGS. 3 and 5, the chamfer 38 of the nut 16 has a slope corresponding to the incline portion 32 of the bolt 14. In some embodiments, the slope is about 45 degrees. Thus, as the nut 16 is screwed onto the bolt 14, force is exerted onto the electrode 44 of the terminal 42. Downward force from the nut 16 causes the electrode 44 to deform around the body 26 of the bolt 14, as shown in FIG. 6 without the nut 16. Thus, this illustrates the electrical ground strap assembly 10 in its tightened state with the electrode 44 being deformed between the bolt 14 and the nut 16. It should be appreciated that deforming the electrode 44 to conform to the body 26 of the bolt 14 increases grounding between the carrier plate 12 and the terminal 42.

Prior to deforming the electrode 44 around the bolt 14, the entire electrical ground strap assembly 10 may be coated, such as e-coated, with paint or any other suitable coating material. However, doing so typically results in paint or residue remaining on the carrier plate 12 and the shaft of the bolt 14, which results in poor decreased electrical grounding.

Figure 10:
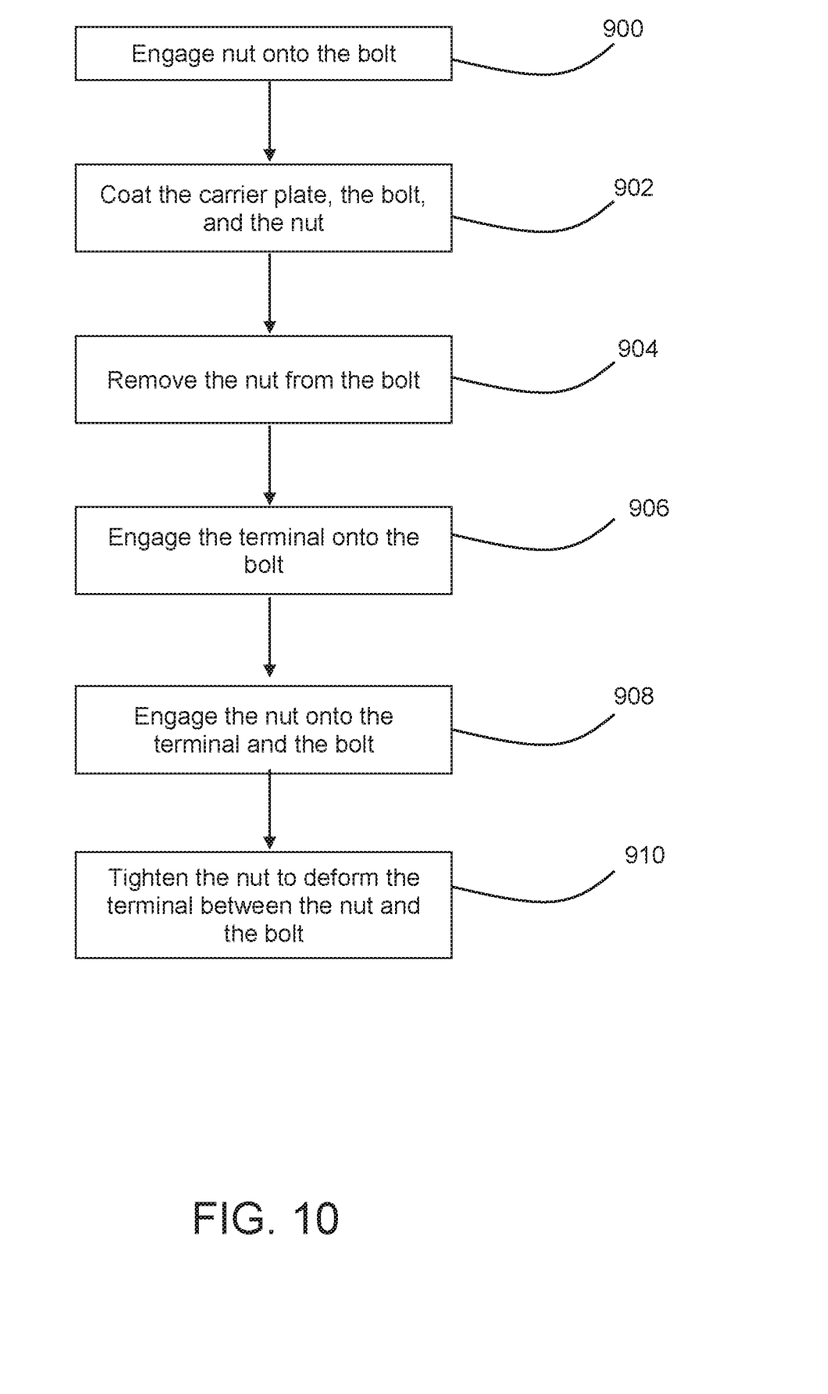
FIG. 10 is a flowchart illustrating another aspect of the present disclosure.

Thus, the present disclosure also seeks to alleviate this problem by removing this paint and residue. In doing so, as illustrated in FIG. 10, the nut 16 is placed onto the bolt 14 prior to coating (Step 900). Once the electrical ground strap assembly 10 is coated (Step 902), the nut 16 is removed (Step 904), which results in a clean, un-coated surface on the carrier plate 12. In addition, as the nut 16 is removed from the bolt 14, the scraping feature 40 on the nut 16 removes paint and residue on the body 26 and the shaft 28 of the bolt 14. By removing paint and residue from the body 26 of the bolt 14, the electrical contact between the electrode 44 of the terminal 42 and the bolt 14 is improved. Thereafter, the electrode 44 may be positioned on the carrier plate 12 (Step 906) and the nut 16 screwed back onto the bolt 14 (Step 908) as discussed above. The scraping feature 40 also provides the additional benefit of scraping the top surface of the electrode 44 as it is lowered, thereby scrapes film or porosity from oxidation of aluminum as the electrode 44 is deformed (Step 910).

Figure 7:
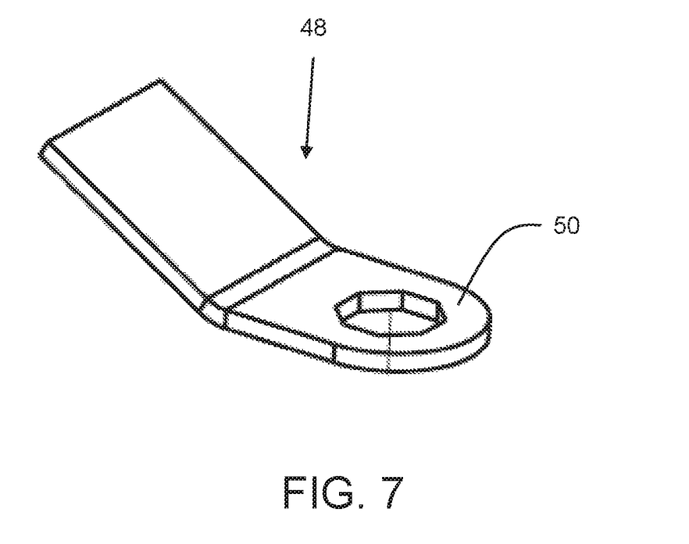
FIG. 7 is a partial perspective view of an alternative embodiment of a terminal used in accordance with the present disclosure.
Figure 8:
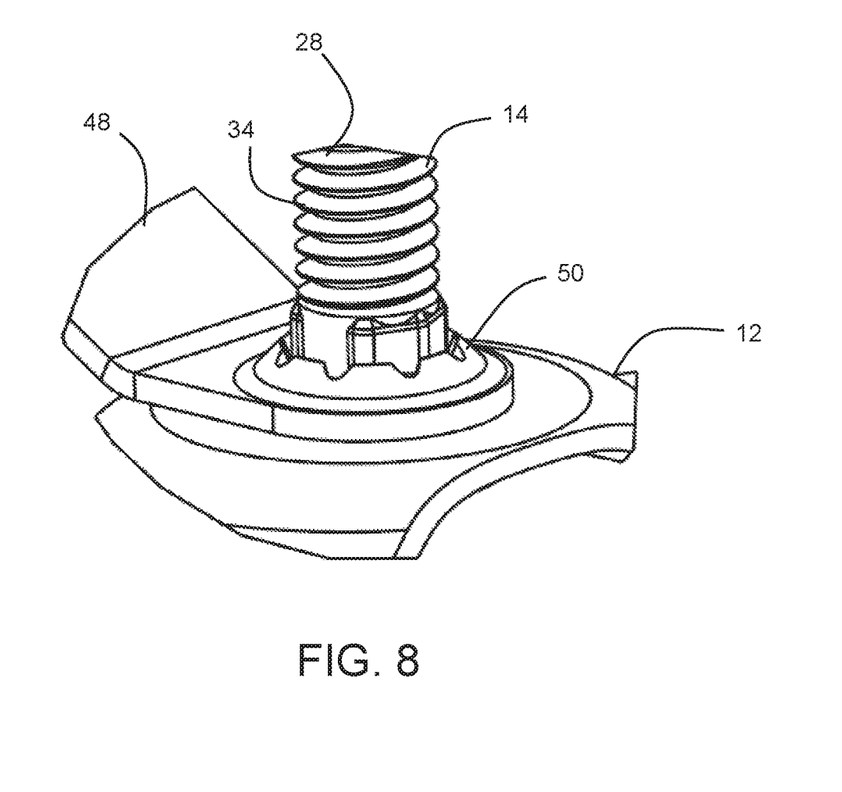
FIG. 8 is a partial perspective view of the ground strap assembly in a tightened state utilizing the terminal of FIG. 7.

It should be noted that the electrode 44 of the terminal 42 is not limited to having a circular cross-section as illustrated in FIG. 2. As shown in FIGS. 7 and 8, a terminal 48 is shown having electrode 50 with an octagonal cross-section corresponding to the cross-section of the shaft 28 of the bolt 14. When the cross-section of the electrode 50 corresponds to the cross-section of the shaft 28 of the bolt 14, the electrode 50 is prevented from rotating as the nut 16 comes into contact with the electrode 50. As such, any other geometry corresponding to the geometry of the bolt 14 would be useful in preventing rotation of the electrode 50 as the nut 16 is lowered on the bolt 14. Terminal 48 and terminal 42 may be used interchangeably based on the desires of the user and geometry of the electrical ground strap assembly 10.

Figure 9:
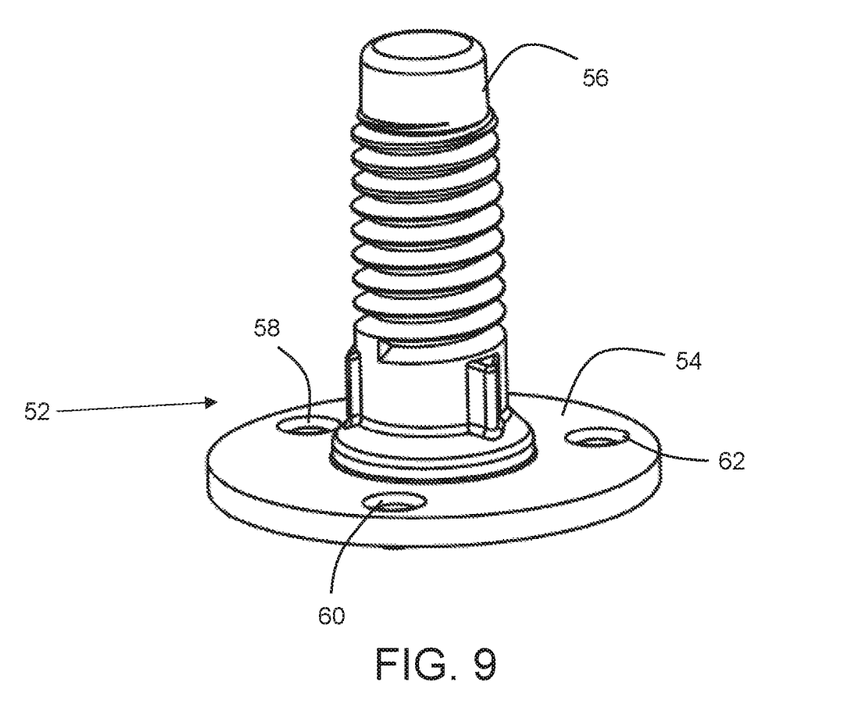
FIG. 9 a perspective view of an alternative embodiment of the electrical ground strap in accordance with the present disclosure.

It is to be understood that while there may be benefits of providing the carrier plate 12 and bolt 14 as separate components, the present disclosure may be provided as an initially integrally formed structure. It should be understood that the term "integrally formed" for purposes herein, should be interpreted as being a one-piece monolithic structure. Further, such a one-piece monolithic structure may be formed by being milled or cast from a single piece of material. As shown in FIG. 9, an electrical ground strap assembly 52 is shown having a carrier plate 54 and a bolt 56 that are integrally formed. Thus, the carrier plate 54 is a radially-extending surface formed with and extending from the bolt 56. This configuration may be referred to as an arc stud as opposed to the carrier plate/bolt combination. As a result, the electrical ground strap assembly 52 requires less material to be formed and takes up less surfaces area on the attached structure. In addition, the electrical ground strap assembly 52 includes three contact surfaces 58, 60, 62 that protrude from the carrier plate 54. In some embodiments, the contact surfaces are disposed equidistantly around a circumference of the carrier plate 54. The contact surfaces 58, 60, 62 protrude from a bottom surface of the carrier plate 54 and assists in avoiding blowing or burning a hole through thin gauge materials.

From the above, it is to be appreciated that defined herein is a new and unique electrical ground strap assembly for use in vehicles to provide increased electrical grounding.

One skilled in the art will readily recognize from such discussion, and from the accompanying drawings and claims, that various changes, modifications, and other variations can be made therein without departing from the full scope of the present disclosure as defined by the following claims.

What is claimed is:

1. An electrical ground strap assembly for attaching a terminal to a vehicle, the electrical ground strap assembly comprising:
   a carrier plate;
   a bolt having a head, a body including a vertical portion and an incline portion, and a shaft, the incline portion being oriented at an angle ranging from 30 to 60 degrees with respect to the vertical portion; and
   a nut having an interior chamfer, the interior chamfer being oriented at an angle corresponding to the incline portion of the bolt.

2. The electrical ground strap assembly of claim 1, wherein the interior of the nut includes a plurality of scraping features, each one of the scraping features including a raised ledge and a scraping edge which defines a thickness between the raised ledge and the interior chamfer of the nut.

3. The electrical ground strap assembly of claim 2, wherein the scraping features are provided on the interior chamfer of the nut.

4. The electrical ground strap assembly of claim 1, wherein the nut and the carrier plate cooperate to deform the terminal when positioned therebetween.

5. The electrical ground strap assembly of claim 4, wherein the carrier plate includes at least one contact surface.

6. The electrical ground strap assembly of claim 5, wherein the carrier plate includes a plurality of contact surfaces, the plurality of contact surfaces being equidistantly disposed around a circumference of the carrier plate.

7. The electrical ground strap assembly of claim 1, wherein the carrier plate and the bolt are integrally formed.

8. An electrical ground strap assembly for attaching a terminal to a vehicle, the electrical ground strap assembly comprising:
   a terminal including an electrode and a strap;
   a carrier plate;
   a bolt having a head, a body including a vertical portion and an incline portion, and a shaft, the incline portion being oriented at an angle ranging from 30 to 60 degrees with respect to the vertical portion; and
   a nut having an interior chamfer, the interior chamfer being oriented at an angle corresponding to the incline portion of the bolt.

9. The electrical ground strap assembly of claim 8, wherein the interior of the nut includes a plurality of scraping features, each one of the scraping features including a raised ledge and a scraping edge which defines a thickness between the raised ledge and the interior chamfer of the nut.

10. The electrical ground strap assembly of claim 8, wherein the nut and the carrier plate cooperate to deform the electrode of the terminal when positioned therebetween.

11. The electrical ground strap assembly of claim 10, wherein the carrier plate includes at least one contact surface.

12. The electrical ground strap assembly of claim 11, wherein the carrier plate includes a plurality of contact surfaces, the plurality of contact surfaces being equidistantly disposed around a circumference of the carrier plate.

13. The electrical ground strap assembly of claim 8, wherein the carrier plate and the bolt are integrally formed.

14. A method for securing a electrical terminal onto a vehicle, the method comprising the steps of:
   providing a carrier plate and a bolt, the bolt having a head, a body including a vertical portion and an incline portion, and a shaft, the incline portion being oriented at an angle ranging from 30 to 60 degrees with respect to the vertical portion;
   providing a terminal including an electrode and a strap;
   engaging the electrode onto the bolt; and
   engaging a nut onto the bolt and onto the electrode, the nut including an interior chamfer being oriented at an angle corresponding to the incline portion of the bolt,
   wherein the engaging of the nut onto the bolt and the electrode deforms the electrode to provide a mating fit between the incline portion of the bolt and the interior chamfer of the nut.

15. The method of claim 14, wherein the interior of the nut includes a plurality of scraping features, each one of the scraping features including a raised ledge and a scraping edge which defines a thickness between the raised ledge and the interior chamfer of the nut.

16. The method of claim 14 further comprising the steps of:
   prior to engaging the electrode onto the bolt, engaging the nut onto the bolt;
   subsequently, coating the carrier plate, the bolt, and the nut; and
   after coating the carrier plate, the bolt, and the nut, removing the nut to provide an un-coated surface on the bolt and a portion of the carrier plate.

17. The method of claim 14, wherein the nut and the carrier plate cooperate to deform the electrode of the terminal when positioned therebetween.

18. The method of claim 14, wherein the carrier plate and the bolt are integrally formed.

19. The method of claim 14, wherein the carrier plate includes at least one contact surface.

20. The method of claim 19, wherein the carrier plate includes three contact points, the three contact points being equidistantly disposed around a circumference of the carrier plate.

* * * * *